United States Patent
Tannhäuser et al.

(10) Patent No.: US 9,039,194 B2
(45) Date of Patent: May 26, 2015

(54) METHOD AND DEVICE FOR CONTROLLING A VIDEO PROJECTOR IN A VIDEO PROJECTION SYSTEM COMPRISING MULTIPLE VIDEO PROJECTORS

(71) Applicant: CANON KABUSHIKI KAISHA, Tokyo (JP)

(72) Inventors: Falk Tannhäuser, Rennes (FR); Pascal Rousseau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 13/722,745

(22) Filed: Dec. 20, 2012

(65) Prior Publication Data

US 2013/0169888 A1    Jul. 4, 2013

(30) Foreign Application Priority Data

Dec. 22, 2011    (GB) .................................. 1122084.5

(51) Int. Cl.
    *G03B 21/14*    (2006.01)
    *H04N 9/31*     (2006.01)
    *G03B 33/10*    (2006.01)

(52) U.S. Cl.
    CPC ............ *H04N 9/3194* (2013.01); *G03B 21/147* (2013.01); *G03B 33/10* (2013.01); *H04N 9/3185* (2013.01); *H04N 9/3147* (2013.01); *H04N 9/3188* (2013.01)

(58) Field of Classification Search
    CPC ...... G03B 21/14; G03B 21/147; G03B 33/10; H04N 9/31; H04N 9/3179; H04N 9/3185; H04N 9/3188; H04N 9/3191; H04N 9/3194; H04N 9/3147

USPC .......... 353/30–31, 69–70, 101; 348/744–745, 348/806; 345/1.3, 619, 629, 634, 643–644, 345/647, 667, 671
    See application file for complete search history.

(56) References Cited

U.S. PATENT DOCUMENTS

| | | | |
|---|---|---|---|
| 6,367,933 B1 * | 4/2002 | Chen et al. ...................... | 353/69 |
| 6,733,138 B2 * | 5/2004 | Raskar ............................ | 353/94 |
| 6,974,217 B2 * | 12/2005 | Kimura et al. .................. | 353/69 |
| 7,119,833 B2 * | 10/2006 | Jaynes et al. .................. | 348/189 |
| 7,125,122 B2 * | 10/2006 | Li et al. ........................... | 353/31 |
| 7,133,570 B1 | 11/2006 | Schreier et al. | |
| 7,854,518 B2 * | 12/2010 | Culbertson et al. ............. | 353/69 |
| 7,946,718 B2 * | 5/2011 | O'Donnell ..................... | 353/101 |

(Continued)

*Primary Examiner* — Jori S Reilly-Diakun

(74) *Attorney, Agent, or Firm* — Canon U.S.A, Inc. IP Division

(57) ABSTRACT

Controlling at least one video projector of a video projection system comprising multiple video projectors having a modifiable focal length and adapted to project sub-images. After determining a first calibration parameter associated with a first predetermined focal length of the video projectors, a second calibration parameter corresponding to a second predetermined focal length of the video projectors is computed, the second calibration parameter computed as a function of the first calibration parameter and the second predetermined focal length different from the first one. A display parameter is computed for a video projector, the display parameter being computed as a function of second calibration parameter, and a sub-image to be projected by the video projector is calculated according to the computed display parameter. Necessary display parameters are determined during an initial calibration step and used during a projection session whenever the user issues an "optical zoom" command, without repeating the calibration.

20 Claims, 10 Drawing Sheets

(56) References Cited

U.S. PATENT DOCUMENTS

| | | | |
|---|---|---|---|
| 8,272,748 B2 * | 9/2012 | Furui | 353/70 |
| 8,328,365 B2 * | 12/2012 | Sun | 353/69 |
| 8,337,023 B2 * | 12/2012 | Furui | 353/70 |
| 8,556,434 B2 * | 10/2013 | Sawahata | 353/88 |
| 8,662,681 B2 * | 3/2014 | Ishida | 353/101 |
| 8,696,140 B2 * | 4/2014 | Tanaka | 353/69 |
| 8,768,094 B2 * | 7/2014 | Bassi et al. | 382/275 |
| 8,777,420 B2 * | 7/2014 | Furui | 353/69 |
| 2003/0043303 A1 * | 3/2003 | Karuta et al. | 348/744 |
| 2006/0104541 A1 | 5/2006 | Baker et al. | |
| 2007/0182940 A1 * | 8/2007 | Asai | 353/101 |
| 2007/0252955 A1 * | 11/2007 | Asai | 353/69 |
| 2009/0245690 A1 | 10/2009 | Li et al. | |
| 2011/0216284 A1 | 9/2011 | Chae et al. | |

\* cited by examiner

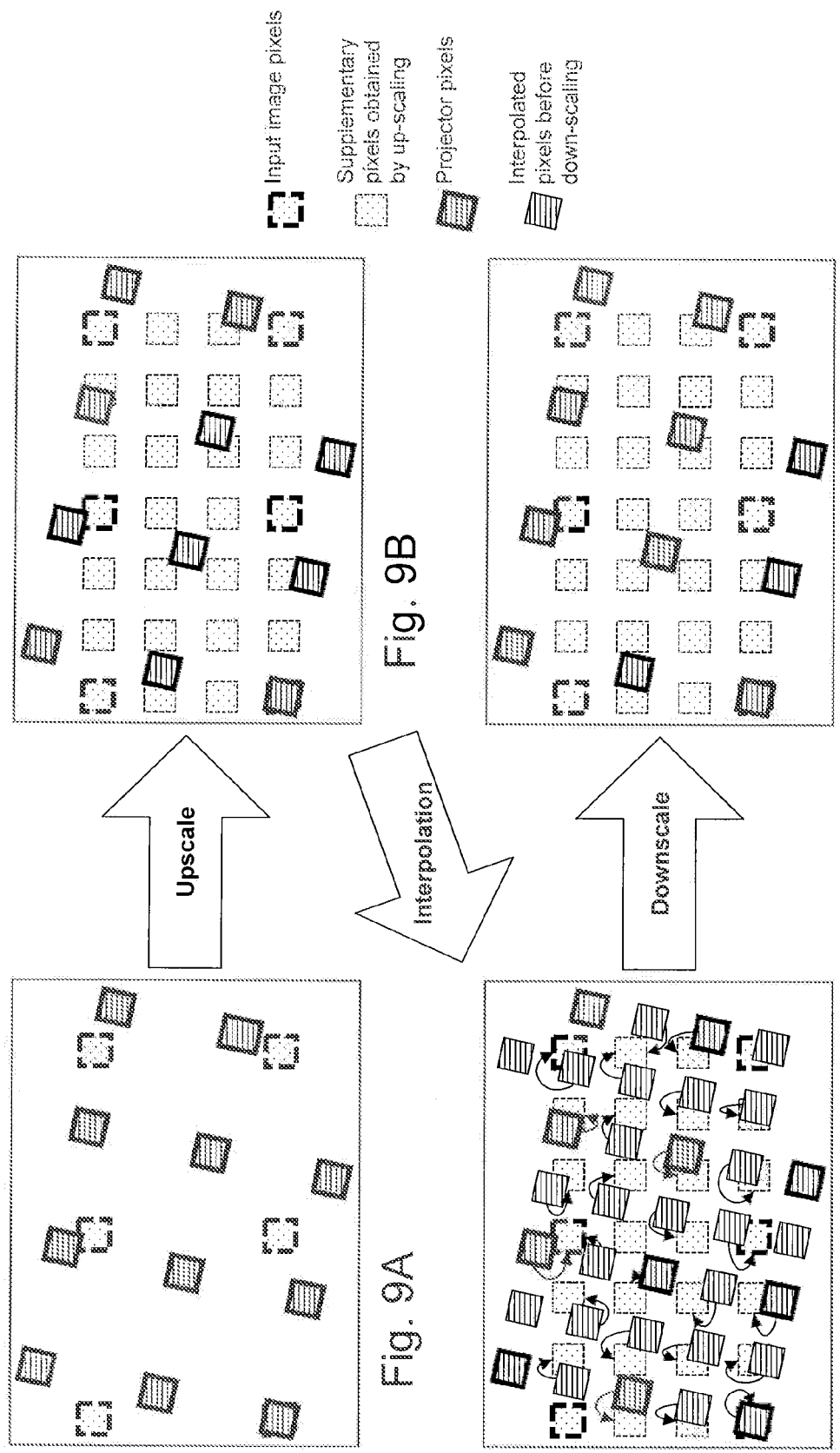

METHOD AND DEVICE FOR CONTROLLING A VIDEO PROJECTOR IN A VIDEO PROJECTION SYSTEM COMPRISING MULTIPLE VIDEO PROJECTORS

CROSS-REFERENCE TO RELATED APPLICATION

This application claims the benefit under 35 U.S.C. §119 (a)-(d) of United Kingdom Patent Application No. 1122084.5, filed on Dec. 22, 2011 and entitled "Method and device for controlling a video projector in a video projection system comprising multiple video projectors". The above cited patent application is incorporated herein by reference in its entirety.

FIELD OF THE INVENTION

The present invention relates generally to video projection and more specifically to a method and a device for controlling a video projector apparatus or a group of aggregated video projector apparatuses.

BACKGROUND OF THE INVENTION

Videos are generally projected as sequences of images on a video screen by a video projection system composed of a single video projector or multiple video projectors generating adjacent, partially overlapping sub-images. Projected images can be of a standard definition or of a high definition (HD), offering high image quality.

When the video projection system used comprises multiple video projectors, each single video projector generates a sub-image with a given definition and a size determined by the video projector lens focal length, the size of the video projector's light modulation device (e.g. an LCD panel), and the distance between the video projector and the video screen. Increasing the projection distance yields a larger but darker projected image (the brightness decreasing with the square of the distance).

Covering efficiently, in terms of brightness, a very large projection screen with the required definition usually requires aggregating several sub-images in a manner that they cover adjacent, partially overlapping zones of the full screen area. In the overlapping zones, blending ensures a smooth transition between sub-images projected by different video projectors in a manner that is tolerant of small displacements introduced, for example, by vibrations or thermal expansion. Blending is a well-known technique that consists in continuously decreasing the brightness of sub-images generated by a video projector towards the border of the projection zone covered by that video projector and complementarily increasing the sub-image brightness of sub-images generated by adjacent video projectors in a manner to obtain uniform brightness after superposition.

Video projectors are commonly equipped with zoom lenses (i.e. lenses with variable focal length) to provide users with freedom in installing a video projector according to given spatial constraints and in choosing the distance between the video projector and the projection screen, as well as letting them flexibly adjust the projected image size versus brightness during a projection session. Typical zoom ranges are from 1.2:1 to 1.7:1. In higher-end projectors the optical zoom is usually motorized and can be actuated through remote control.

The partitioning and blending of sub-images to be projected by a video projection system comprising multiple video projectors have to be carefully adjusted to give the user the impression of a single image throughout the whole projection screen area. To that end, each video projector of a video projection system comprising multiple video projectors is set up so as to control overlapping and blending of areas of the projected sub-images.

This is generally obtained through a calibration process that is typically carried out during system installation or power-up. It often requires user interactions such as taking digital calibration pictures of the screen. Keystone correction and digital rescaling can be performed according to the method disclosed in U.S. 2009/0201431.

However, it has been observed that actuating the optical zooms of video projectors belonging to such a video projection system changes the relative width of the overlapped zones, and hence destroys the calibrated image partitioning and the impression of continuity.

Through optically zooming the lenses of the projectors (e.g. shortening the focal lengths to increase the image size on the screen), the overlapping/blending areas become larger not only in absolute terms but also relatively to the displayed image. Consequently, formerly distinct parts of the image become overlapped and formerly superposed (blended) parts appear duplicated at distinct screen positions. Moreover, the aspect ratio of the display rectangle used for projecting the video images is altered.

Accordingly, there is a need to make the video projection system comprising multiple video projectors behave in a manner analogous to what the user is likely to expect due to her/his experience with single-projector systems offering optical zooming facility.

In particular, there is a need to control image aspect ratio, typically the original 16:9 aspect ratio and for automatically readjusting the partitioned sub-images projected by individual projectors to take into account the larger overlapping and blending areas.

Furthermore, it is desirable to limit the necessary calibration step(s) to the initial system set-up phase (installation or power-up) and to keep it as simple as possible from the user's point of view (once the initial calibration has been done, optical zooming should work in without defects as it does with a single projector).

SUMMARY OF THE INVENTION

Faced with these constraints, the inventors provide a method and a device for controlling a video projector or a group of aggregated video projectors of a video projection system comprising several video projectors so that the video projection system is seen by a user as single video projector.

It is a broad object of the invention to remedy the shortcomings of the prior art as described above.

Accordingly, it would be desirable to provide a method for controlling at least one video projector in a video projection system comprising multiple video projectors amongst which is the at least one video projector, each of the video projectors of the video projection system having a modifiable focal length and being adapted to project sub-images of the images to be projected by the video projection system, the method comprising:

determining at least one first calibration parameter associated with a first predetermined focal length of the video projectors;

computing at least one second calibration parameter corresponding to a second predetermined focal length of the video projectors, the at least one second calibration parameter being computed as a function of the at least one first calibration parameter, the second predetermined focal length being different from the first predetermined focal length;

computing at least one display parameter for at least the at least one video projector, the at least one display parameter being computed as a function of the at least one second calibration parameter; and calculating at least one sub-image to be projected by the at least one video projector, according to the at least one computed display parameter.

According to the invention, necessary display parameters are determined during an initial calibration step and can be used during a projection session whenever the user issues an "optical zoom" command, without the need for repeating the calibration.

According to a particular embodiment, the at least one first and second calibration parameters comprise positions of predetermined points of sub-images projected by video projectors of a set of the video projectors, the set of video projectors comprising the at least one video projector, and the at least one display parameter relates to a projection position of a sub-image to be projected by the at least one video projector. Such predetermined points can be corners that are easily identified. It is noted here that the calibration precision increases when two or more calibration points are used, even in the presence of fabrication or installation tolerances.

Determining at least one first calibration parameter may comprise a step of analysing a picture representing sub-images projected by the video projectors of the set of video projectors.

Still according to a particular embodiment, the step of computing at least one display parameter uses a keystone distortion correction algorithm.

The step of computing at least one display parameter may comprise the two determining steps of determining at least one sub-image that is to be projected by the at least one video projector and determining the projection position of the at least one sub-image that is to be projected by the at least one video projector, the two determining steps being based upon the at least one second calibration parameter. The method according to the invention is thus easily implemented.

The at least one display parameter typically comprises parameters of partitioning, re-scaling, and geometric distortion correction of images to be displayed by the video projection system for each of the video projectors of the video projection system.

The step of computing at least one display parameter may comprise a step of determining at least one blending area in a projection area associated with the at least one video projector, common to projection areas associated with other video projectors of the video projection system, so that the luminance of pixels projected in the at least one blending area is constant.

According to a particular embodiment, the first predetermined focal length of the video projectors is the minimum focal length of the projectors' zoom lenses. It is noted that a minimum focal length means a maximum image size. Hence, the relative measurement errors introduced during calibration are minimized.

Still according to a particular embodiment, the at least one first calibration parameter is determined for at least two distinct calibration focal lengths. The at least two distinct calibration focal lengths may comprise the minimum and maximum focal lengths of the projectors' zoom lenses, interpolation from the two extreme focal lengths enabling better calibration precision for an intermediate focal length.

Still according to a particular embodiment, the step of calculating at least one sub-image to be projected by the at least one video projector comprises a step of up-scaling a part of an image to be projected by the video projection system, interpolating points of the part of the image, and down-scaling the part of the image for correcting geometric distortions.

It would also be desirable to provide a computer program comprising instructions for carrying out each step of the method described above when the program is loaded and executed by a programmable apparatus. The advantages provided by such a computer program are similar to the ones described above.

It would also be desirable to provide an apparatus for controlling at least one video projector in a video projection system comprising multiple video projectors amongst which is the at least one video projector, each of the video projectors of the video projection system having a modifiable focal length and being adapted to project sub-images of the images to be projected by the video projection system, the apparatus comprising at least one microprocessor configured for carrying out the steps of, determining at least one first calibration parameter associated with a first predetermined focal length of the video projectors;

computing at least one second calibration parameter corresponding to a second predetermined focal length of the video projectors, the at least one second calibration parameter being computed as a function of the at least one first calibration parameter and the second predetermined focal length being different from the first predetermined focal length;

computing at least one display parameter for the at least one video projector, the at least one display parameter being computed as a function of the at least one second calibration parameter; and calculating at least one sub-image to be projected by the at least one video projector according to the at least one computed display parameter.

Again, necessary display parameters are determined during an initial calibration step and can be used during a projection session whenever the user issues an "optical zoom" command, without the need for repeating the calibration.

At least one of the at least one microprocessor can be common to a plurality of video projectors of the video projection system or can be dedicated to one of the video projectors of the video projection system.

According to a particular embodiment, the at least one microprocessor is further configured for carrying out a step of analysing a picture representing sub-images projected by the video projectors of the set of video projectors when carrying out the step of determining at least one first calibration parameter.

Still according to a particular embodiment, the at least one microprocessor is further configured for implementing a keystone distortion correction algorithm when carrying out the step of computing at least one display parameter.

The at least one microprocessor may further be configured for carrying out determining steps of determining at least one sub-image that is to be projected by the at least one video projector and determining the projection position of the at least one sub-image that is to be projected by the at least one video projector, when computing at least one display parameter, wherein the two determining steps are based upon the at least one second calibration parameter.

The at least one microprocessor may also be further configured for carrying out a step of determining at least one blending area in a projection area associated with the at least one video projector, common to projection areas associated with other video projectors of the video projection system, when carrying out the step of computing at least one display parameter, so that the luminance of pixels projected in the at least one blending area is constant.

According to a particular embodiment, the at least one microprocessor is further configured for carrying out a step of up-scaling a part of an image to be projected by the video projection system, interpolating points of the part of the image, and down-scaling the part of the image, when carrying out the step of calculating at least one sub-image to be projected by the at least one video projector, so as to correct geometric distortions.

It would also be desirable to provide a method for controlling at least one video projector in a video projection system comprising multiple video projectors amongst which is the at least one video projector, substantially as herein described with reference to, and as shown in, FIG. 6 of the accompanying drawings, and an apparatus for controlling at least one video projector in a video projection system comprising multiple video projectors amongst which is the at least one video projector, substantially as herein described with reference to, and as shown in, FIG. 1 and FIG. 6 of the accompanying drawings.

BRIEF DESCRIPTION OF THE DRAWINGS

Further advantages of the present invention will become apparent to those skilled in the art upon examination of the drawings and detailed description. It is intended that any additional advantages be incorporated herein.

FIG. 2, comprising

FIG. 4, comprising

FIG. 5, comprising

FIG. 9, comprising FIGS. 9A to 9D, illustrates up-scaling, interpolating and down-scaling steps that can be implemented according to the invention.

DETAILED DESCRIPTION OF EMBODIMENTS OF THE INVENTION

For the sake of clarity below, an image or a video image refers to an image displayed on a video screen by a video system comprising one or several video projectors (also referred to as projectors) while a sub-image is an image projected by a single projector of a video system (comprising one or several projectors).

According to the invention, the control of one video projector or a group of video projectors in a video projection system comprising several video projectors is performed in two stages, one relating to the initialization of the system and another one being directed to zoom commands during video projection.

Generally speaking, the initialization stage according to the invention preferably comprises the following steps:
  adjusting parameters of all projectors to a given focal length, preferably the minimum focal length that corresponds to the maximum sub-image size for a given distance between projectors and screen;
  determining the coordinates of the corners delimiting the area covered by each projector on the screen (e.g. through taking one or more pictures of the screen);
  for each projector, determining the corresponding geometric distortion correction (homography); this step is optionally repeated for a different focal length, e.g. the maximum focal length that corresponds to a minimum sub-image size;
  calculating the sub-image corners, using the homography, for several predetermined focal lengths (from minimum to maximum);
  among these predetermined focal lengths, finding the maximum focal length, corresponding to the minimum sub-image size, for which sufficient screen projection coverage is obtained (blending zones above predetermined threshold) so as to be able to prevent zooming smaller than that minimum sub-image size; and,
  for each predetermined focal length, fitting a part of an image to be projected (typically an image rectangle) into the projection zone (keeping the original aspect ratio) and re-calculating the image parts (including blending) to be displayed by each of the projectors.

When a zoom command is activated during video projection, the optical zooms of all video projectors of the video system are simultaneously adjusted to the appropriate focal length among aforementioned predetermined ones (step by step from the current predetermined focal length to another predetermined focal length via intermediate predetermined focal lengths), and the predetermined image zone, re-scaling factor and, geometric distortion compensation are adjusted in all projectors.

Figure 1:
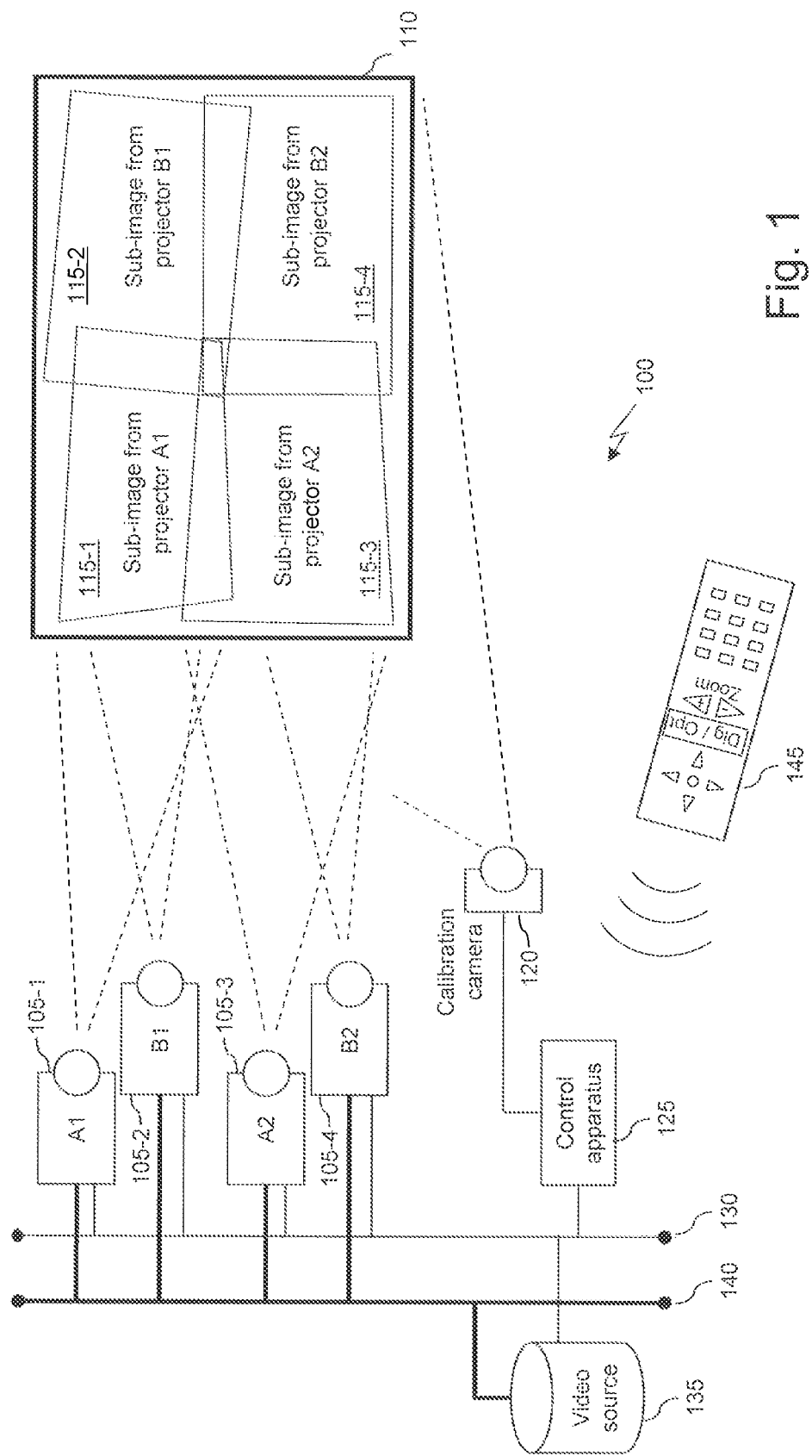
FIG. 1 schematically represents an example of a video projection system comprising multiple video projectors for displaying video.

FIG. 1 illustrates an example of a video projection system comprising multiple video projectors for displaying video, also referred to as a multi-projection system.

As shown, the multi-projection system 100 comprises, here, four video projectors 105-1, 105-2, 105-3, and 105-4, referred to as A1, B1, A2, and B2, respectively, of the same model. Sub-images are projected from the video projectors 105-1 to 105-4 onto a flat projection screen 110. With the optical zoom lens of each projector adjusted to a given focal length, each of these projectors illuminates a quadrilateral area of the projection screen 110, referenced respectively 115-1, 115-2, 115-3, and 115-4. The four quadrilateral projection areas are arranged in two horizontal rows and two vertical columns. Their border zones overlap.

Due to the fact that the projectors' optical axes are not perfectly orthogonal to the plane of the projection screen 110 and due to mechanical tolerances in the mountings of the four projectors, the projection areas 115-1, 115-2, 115-3, and 115-4 may suffer from geometric distortions. Consequently, the quadrilaterals projection areas are generally not rectangles and their borders are generally not parallel to the borders of the projection screen 100.

Naturally, the number of projectors in the system is not limited to four and neither the number of horizontal rows nor the number of vertical columns is limited to two.

During system installation or power-up, a calibration stage is necessary to gather input data for properly splitting the video image to be projected between the different video projectors, taking into account the overlapping as well as the geometric distortion of the sub-images projected by the projectors. At this stage, a digital calibration camera 120 is used to take one or more pictures of the whole projection screen 110 comprising sub-images displayed respectively in the four projection areas 115-1, 115-2, 115-3, and 115-4, for each predetermined calibration focal length.

In a particular embodiment, initialization of the video system is enabled by a single picture of the projection screen per calibration focal length, when all four video projectors 105-1 to 105-4 simultaneously project a uniformly white or gray image.

Alternatively, several cameras placed at different positions are used instead of the single camera 120. For example, each of the video projectors 105-1 to 105-4 may incorporate its own calibration camera configured to take pictures of the corresponding projection area 115-1 to 115-4, respectively, together with its surroundings. Still in an alternative embodiment, a single camera may be used to take several pictures from different positions, in particular when it is not possible to fit the whole projection screen 110 within a single picture.

The digital calibration pictures taken by camera 120 (or equivalent cameras) are transferred to and analyzed by control apparatus 125. Such an analysis is described with reference to FIGS. 2 and 3.

The control apparatus 125 is connected to the video projectors 105-1 to 105-4 by means of a control network 130 so that it is capable of providing the video projectors with geometric correction parameters as well as coordinates describing the part of the video image that each respective projector has to project, including the blending zones. These parameters and coordinates are described in relation to FIG. 5.

In a particular embodiment, control apparatus 125 is physically embedded into one of the video projectors 105-1 to 105-4. The latter acts as a master projector and the others act as slave projectors. It is to be noted that the functionalities of the control apparatus 125 may be split among the video projectors 105-1 to 105-4. In such a case, the video projector acting as a master projector performs the parts of processing that need to be centralized while all the other video projectors perform the remaining parts of processing in a distributed manner, all the video projectors exchanging information through control network 130. Such processing is described with reference to FIG. 6.

The images to be displayed on the projection screen 110 come from a video source 135, preferably an HD video source. The video source 135 may be a digital video camera, a hard-disk or solid-state drive, a digital video recorder, a personal computer, a set-top box, a video game console, or similar. It is connected to each of the video projectors 105-1 to 105-4 through a high-speed, low latency video network 140 that can be any wired or wireless LAN (Local Area Network) providing a sufficient data rate for transporting HD video, for example a communication network conforming with the IEEE 802.11 or the IEEE 802.3 standards. Device connection technologies known as W-HDMI (Wireless High Definition Multimedia Interface), IEEE 1394, and USB (Universal Serial Bus) may also be used.

The video format involved between the video source and the video projectors may be of the compressed type such as MPEG (Moving Picture Experts Group) or H.264 or of the raw type such as RGB or YCbCr, possibly with chroma subsampling, with resolutions ranging from standard definition to high definition HD 1080p (1920×1080) or higher, color depth of 24 or 36 bits/pixel, and frame rates of 30 or 60 frames/second.

The video transmission over video network 140 may be of the point-to-multipoint type (i.e. each of the video projectors 105-1 to 105-4 receives the whole video stream) or of the point-to-point type (i.e. each video projector receives only a part of the video stream, representing the sub-image the video projector is required to project).

In a particular embodiment, a single network takes the role of both the video network 140 and the control network 130.

The control apparatus 125 is also capable of receiving commands (e.g. through infrared link) from the remote control 145, in particular commands for applying both optical and digital zoom, as well as commands destined for the video source 135 (for example play, stop, and program select commands). Control apparatus 125 is capable of forwarding received commands to the video source 135 through the control network 130, as illustrated. Furthermore, the video source 135 here communicates the video resolution used to the control apparatus 125 through the control network 130.

Figure 2A:
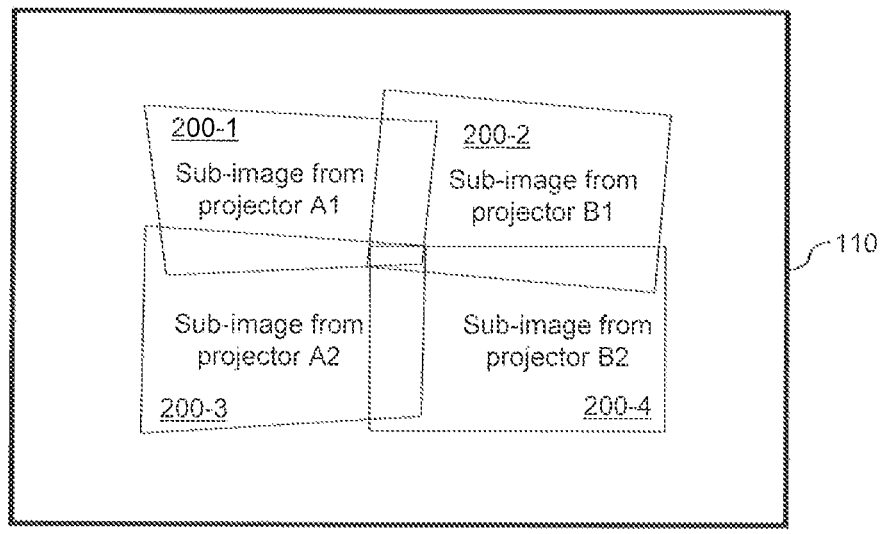
FIG. 2A and FIG. 2B, represents examples of a screen in a video projection system comprising multiple video projectors, for two different calibration focal lengths.
Figure 2B:
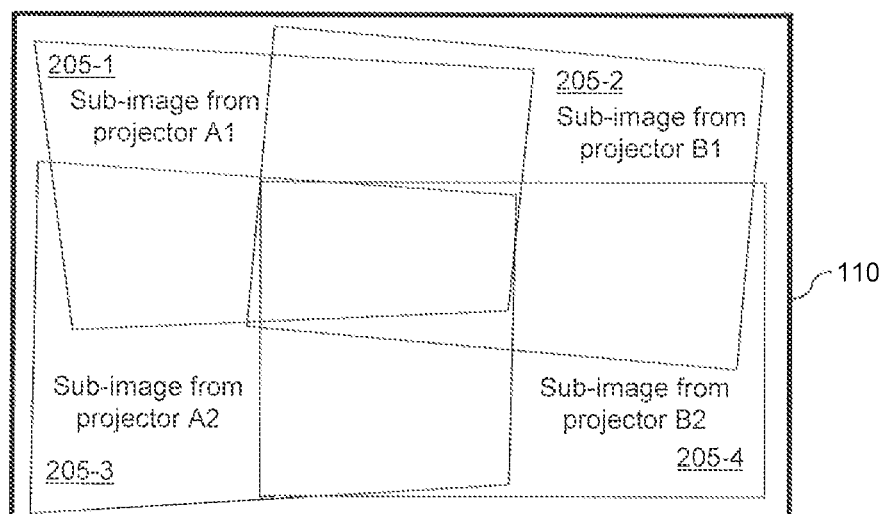

FIG. 2, comprising FIGS. 2A and 2B, illustrates the projection of sub-images on a flat projection screen, for example the projection of sub-images from the four projectors 105-1 to 105-4 on projection screen 110 of FIG. 1. For the sake of illustration, the projected sub-images are arranged in two horizontal rows and two vertical columns. The light beams originating from the projectors A1, B1, A2, and B2 each cover a quadrilateral area delimited by a thin solid line in FIG. 2.

According to FIG. 2A, the focal length of the zoom lens of each projector is set to a value equal to $f_{cal\_1}$ which corresponds, for example, to the maximum focal length of the lens. The resulting quadrilateral areas, representing the projection areas, shown in FIG. 2A, are denoted respectively 200-1, 200-2, 200-3, and 200-4. Similarly, according to FIG. 2B, the focal length of the zoom lens of each projector is set to a value equal to $f_{cal\_2}$ which corresponds, for example, to the minimum focal length of the lens. Value $f_{cal\_2}$ is smaller than value $f_{cal\_1}$. The resulting quadrilateral areas, representing the projection areas, shown in FIG. 2B, are denoted respectively 205-1, 205-2, 205-3, and 205-4. They are larger than quadrilateral areas 200-1, 200-2, 200-3, and 200-4, respectively.

The two images corresponding to FIGS. 2A and 2B are captured by control apparatus 125 of FIG. 1, using the calibration camera 120, or are constructed from multiple partial pictures of projection screen 110, after compensating for the perspective distortion introduced by the camera 120 whose optical axis is not necessarily orthogonal to the plane of the projection screen 110 while taking the picture and whose orientation is not necessarily perfectly horizontal. This camera perspective compensation is possible thanks to the border of projection screen 110, delimited by a thick solid line, appearing in the image, which can serve as orientation mark.

Figure 3:
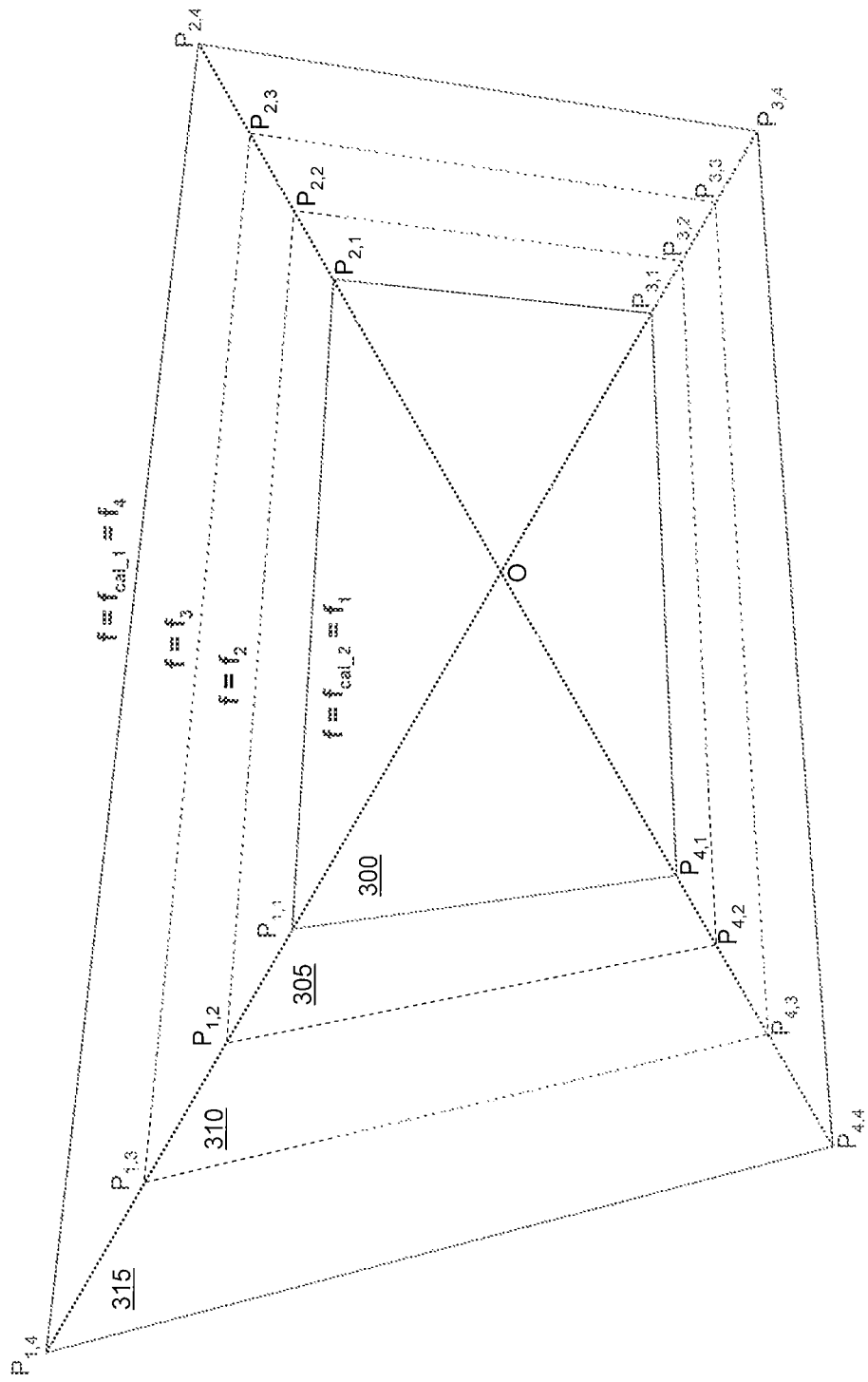
FIG. 3 schematically represents the screen projection zone of a single projector using screen coordinates for two different calibration focal lengths and two intermediate target focal lengths.

FIG. 3 shows quadrilateral screen zones 300-1, 300-2, 300-3, and 300-4 illuminated by the light beam of a single projector for different focal lengths noted $f_1$, $f_2$, $f_3$, and $f_4$, respectively. FIG. 3 illustrates how the corner coordinates of these quadrilaterals may be calculated from the corner coordinates corresponding to one or more calibration focal lengths, e.g. $f_{cal\_1}$ and $f_{cal\_2}$.

In case of non-distorted projection, i.e. when the projector's optical axis is perpendicular to the projection screen, the sub-image magnification M is the ratio between the height or width of the sub-image on the projection screen to the height, respectively width, of the projector's light modulation device, the latter typically being an LCD (Liquid Crystal Display), an LCoS (Liquid Crystal on Silicon), or a DMD (Digital micro-Mirror Device). The magnification M and the focal length f can be expressed as a function of the distance d between the lens and the light modulation device and of the distance D between the lens and the projection screen as follows:

$$M = \frac{D}{d} \text{ and } \frac{1}{f} = \frac{1}{D} + \frac{1}{d}$$

Accordingly, the magnification M can be expressed as a function of the focal length:

$$M = \frac{D}{f} - 1$$

Therefore, when considering two different focal lengths $f_1$ and $f_2$, the two associated magnifications $M_1$ and $M_2$, and a constant projection distance D, the ratio of the focal lengths can be expressed as follow:

$$\frac{f_2}{f_1} = \frac{M_1 + 1}{M_2 + 1}$$

which can be simplified (by considering that M>>1) as follows $$\frac{f_2}{f_1} = \frac{M_1}{M_2}$$

However, the projector's optical axis is generally not perpendicular to the projection screen and consequently the projected sub-images undergo a geometric distortion that is called a homography and which can be mathematically expressed as a 3×3 matrix (referred to as matrix H) with real coefficients:

$$H = \begin{pmatrix} \alpha_{1,1} & \alpha_{1,2} & \alpha_{1,3} \\ \alpha_{2,1} & \alpha_{2,2} & \alpha_{2,3} \\ \alpha_{3,1} & \alpha_{3,2} & \alpha_{3,3} \end{pmatrix}$$

The homography matrix transforming an original rectangular sub-image, produced by a projector's light modulation device, to a quadrilateral area (projected sub-image), e.g. the quadrilateral 315, can be obtained by the following steps:
  determining a coordinate system for an original rectangular sub-image (preferably the largest, corresponding to focal length $f_4$). This is advantageously carried out by placing the origin O' of the coordinate system, having the coordinates (0, 0), at the center of the original rectangular sub-image. It is noted that the origin of the original rectangular sub-image coincides with the intersection point of its diagonals. The corners of the original rectangular sub-image are referred to $P'_{1,4}$, $P'_{2,4}$, $P'_{3,4}$, and $P'_{4,4}$ when considering the focal length $f_4$. Their coordinates may be expressed as follows: $P'_{1,4}=(-1, 1)$, $P'_{2,4}=(1, 1)$, $P'_{3,4}=(1, -1)$, and $P'_{4,4}=(-1, -1)$. It is to be noted that for the sake of illustration, the designation of points in the original sub-image (the latter not being represented in the Figure) is identical to their corresponding screen points but with the addition of the prime symbol (').
  obtaining the screen coordinates of the corners of the corresponding projected sub-image (quadrilateral area 315), referred to here as $P_{1,4}$, $P_{2,4}$, $P_{3,4}$, and $P_{4,4}$ through analyzing a calibration sub-image of the projection screen, for example projection screen 110 obtained by the digital camera 120 of FIG. 1. The calibration sub-image is, for example, a uniformly white or grey sub-image. As mentioned above, the projector's zoom lens is preferably positioned at focal length $f_{cal\_1}$ which is the minimum possible focal length of the zoom lens, i.e. the one that produces the largest possible screen sub-image for a given installation.
  determining the values of the coefficients of matrix M for transforming the coordinates of a point (x, y) of the projection screen into the coordinates of the corresponding point (x', y') of the original rectangular sub-image. An original point (x', y') and its corresponding screen sub-image point (x, y) are related through the following equation in homogenous 3-dimensional coordinates, $$\beta \begin{pmatrix} x \\ y \\ 1 \end{pmatrix} = H \begin{pmatrix} x' \\ y' \\ 1 \end{pmatrix}$$

where β is a scalar factor. Using the correspondences between the four screen sub-image points $P_{1,4}$ ($x_1$, $y_1$), $P_{2,4}$ ($x_2$, $y_2$), $P_{3,4}$ ($x_3$, $y_3$), and $P_{4,4}$ ($x_4$, $y_4$) and the respective original points $P'_{1,4}$ ($x'_1$, $y'_1$), $P'_{2,4}$ ($x'_2$, $y'_2$), $P'_{3,4}$ ($x'_3$, $y'_3$), and $P'_{4,4}$ ($x'_4$, $y'_4$), the following relation is obtained:

$$\begin{pmatrix} x_1 & x_2 & x_3 & x_4 \\ y_1 & y_2 & y_3 & y_4 \\ 1 & 1 & 1 & 1 \end{pmatrix} \begin{pmatrix} \beta_1 & 0 & 0 & 0 \\ 0 & \beta_2 & 0 & 0 \\ 0 & 0 & \beta_3 & 0 \\ 0 & 0 & 0 & \beta_4 \end{pmatrix} = H \begin{pmatrix} x'_1 & x'_2 & x'_3 & x'_4 \\ y'_1 & y'_2 & y'_3 & y'_4 \\ 1 & 1 & 1 & 1 \end{pmatrix}$$

This relationship is equivalent to a linear equation system with twelve equations and thirteen unknowns $\beta_1$ to $\beta_4$ and $\alpha_{1,1}$ to $\alpha_{3,3}$ wherein only the nine latter (the coefficients of H) are relevant here. It is to be noted that H is uniquely defined up to a constant non-zero scalar factor, thus it is possible to arbitrarily fix e.g. $\alpha_{3,3}$ at 1 to obtain a linear equation system with a unique solution.
  optionally, for higher precision, it is possible to use the original rectangular sub-image associated with the focal length $f=f_{cal\_2}=f_1$ and the corresponding projected sub-image. To that end, the coordinates of the corners $P_{1,1}$ ($x_5$, $y_5$), $P_{2,1}$ ($x_6$, $y_6$), $P_{3,1}$ ($x_7$, $y_7$), and $P_{4,1}$ ($x_8$, $Y_8$) of the quadrilateral area 300 are obtained by analyzing a second calibration image projected on the projection screen, for example a picture of the projection screen 110 acquired by the digital camera 120 while projecting e.g. a uniformly white or grey image, the projector's zoom lens being positioned at focal length $f_{cal\_2}$. As described previously, the value $f_{cal\_2}$ is advantageously the maximum possible focal length of the zoom lens, i.e. the one that produces the smallest possible screen sub-image 300 for a given installation. The corresponding points of the original rectangular sub-image referred to $P'_{1,1}$ ($x'_5$, $y'_5$), $P'_{2,1}$ ($x'_6$, $y'_6$), $P'_{3,1}$ ($x'_7$, $y'_7$), and $P'_{4,1}$ ($x'_8$, $y'_8$) are related to the coordinates of the points $P'_{1,4}$, $P'_{2,4}$, $P'_{3,4}$, and $P'_{4,4}$ according to the following relation (in 2-dimensional Cartesian coordinates): $P'_{i,1} = \lambda P'_{i,4}$ with $i=1 \ldots 4$ and $$\lambda = \frac{M_1}{M_4} \approx \frac{f_{cal\_1}}{f_{cal\_2}}$$

$\lambda$ representing the magnification ratio between the two sub-images of the two calibration focal lengths.

The previous matrix equation can thus be modified as follows $$\begin{pmatrix} x_1 & x_2 & x_3 & x_4 & x_5 & x_6 & x_7 & x_8 \\ y_1 & y_2 & y_3 & y_4 & y_5 & y_6 & y_7 & y_8 \\ 1 & 1 & 1 & 1 & 1 & 1 & 1 & 1 \end{pmatrix}$$

$$\begin{pmatrix} \beta_1 & 0 & 0 & 0 & 0 & 0 & 0 & 0 \\ 0 & \beta_2 & 0 & 0 & 0 & 0 & 0 & 0 \\ 0 & 0 & \beta_3 & 0 & 0 & 0 & 0 & 0 \\ 0 & 0 & 0 & \beta_4 & 0 & 0 & 0 & 0 \\ 0 & 0 & 0 & 0 & \beta_5 & 0 & 0 & 0 \\ 0 & 0 & 0 & 0 & 0 & \beta_6 & 0 & 0 \\ 0 & 0 & 0 & 0 & 0 & 0 & \beta_7 & 0 \\ 0 & 0 & 0 & 0 & 0 & 0 & 0 & \beta_8 \end{pmatrix} =$$

$$H \begin{pmatrix} x'_1 & x'_2 & x'_3 & x'_4 & \lambda x'_1 & \lambda x'_2 & \lambda x'_3 & \lambda x'_4 \\ y'_1 & y'_2 & y'_3 & y'_4 & \lambda y'_1 & \lambda y'_2 & \lambda y'_3 & \lambda y'_4 \\ 1 & 1 & 1 & 1 & 1 & 1 & 1 & 1 \end{pmatrix}$$

It is equivalent to an equation system with twenty-four equations and eighteen unknowns $\beta_1$ to $\beta_8$, $\lambda$ and $\alpha_{1,1}$ to $\alpha_{3,3}$ wherein only the nine latter (the coefficients of the matrix H) are relevant here ($\lambda$ may be considered as known if the magnification coefficients $M_1$ and $M_4$, depending on the calibration focal lengths $f_{cal\_1}$ and $f_{cal\_2}$, are known with sufficient precision; in this case, the equation system becomes linear which simplifies solving). Again, it is to be noted that matrix H is uniquely defined up to a constant non-zero scalar factor, thus it is possible to arbitrarily fix e.g. $\alpha_{3,3}$ at 1. However, this equation system remains over-determined and generally has no exact solution due to the equations being contradictory because of measurement errors. Nevertheless, a unique solution resulting in a least-squares error exists. Naturally, it is possible to generalize this equation system to take into account supplementary calibration focal lengths.

To determine the screen coordinates of the corners $P_{1,2}$, $P_{2,2}$, $P_{3,2}$, and $P_{4,2}$ of the quadrilateral area 305 generated at the focal length $f_2$, the homography matrix H obtained during the previous steps is applied to the corresponding points of the original rectangular sub-images $P'_{1,2}$, $P'_{2,2}$, $P'_{3,2}$, and $P'_{4,2}$ (in 3-dimensional homogenous coordinates), the latter points being calculated through the following equation (in 2-dimensional Cartesian coordinates):

$P'_{1,2} = \mu P'_{1,4}$ with $i=1 \ldots 4$ and $$\mu = \frac{M_2}{M_4} \approx \frac{f_2}{f_{cal\_2}}$$

Other focal lengths such as, for example, $f_3$ corresponding to the quadrilateral area 310 with the corners $P_{1,3}$, $P_{2,3}$, $P_{3,3}$, and $P_{4,3}$, can be handled similarly.

FIG. 4, comprising FIGS. 4A to 4D, schematically represents pictures of the projection screen 110 of FIG. 1, each comprising four sub-images projected by video projectors A1, B1, A2, and B2, that consist in the quadrilateral areas illuminated by each of the video projectors, for different focal lengths. The corner coordinates of these quadrilateral areas are obtained either through measurement (i.e. by analyzing a calibration picture taken by camera 120 if the focal length equals one of the calibration focal lengths) or through calculation as described previously by reference to FIG. 3.

FIGS. 4A to 4D schematically represent images of the projection screen 110 of FIG. 1 for the focal lengths $f_1$, $f_2$, $f_3$, and $f_4$, respectively.

For each of the focal lengths $f_1$, $f_2$, $f_3$, and $f_4$, control apparatus 125 determines an image rectangular projection area 400, 410, 420, and 430, respectively (delimited by a thick dotted line). The borders of the determined projection area are parallel to the borders of the projection screen 110. The aspect ratio (the ratio between width and height) of the determined projection area preferably corresponds to the aspect ratio of the video delivered by video source 135 (e.g. 1920 pixels per line and 1080 pixels per column which corresponds to a ratio of 16:9).

Vertical and horizontal stripes are determined to be used as blending zones between neighboring sub-images. For example, vertical stripes 402, 412, 422, and 432 (delimited by thick dashed lines), corresponding to focal lengths $f_1$, $f_2$, $f_3$, and $f_4$, respectively, are defined as blending zones between sub-images projected by projectors A1 and B1 and sub-images projected by projectors A2 and B2. Similarly, horizontal stripes 404, 414, 424, and 434 (also delimited by thick dashed lines), corresponding to focal lengths $f_1$, $f_2$, $f_3$, and $f_4$, respectively, are defined as blending zones between sub-images projected by projectors A1 and A2 and sub-images projected by projectors B1 and B2.

As mentioned above, blending zones (or areas) are areas that are illuminated by two or more projectors.

Figure 4B:
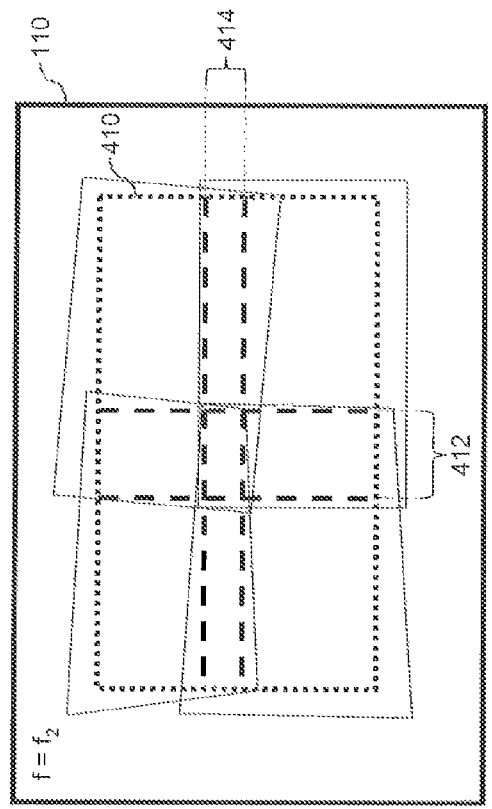
FIGS. 4A to 4D, illustrates examples of a screen in a video projection system comprising multiple video projectors with placing, partitioning and blending of the video image to be displayed, for several different target focal lengths.
Figure 4D:
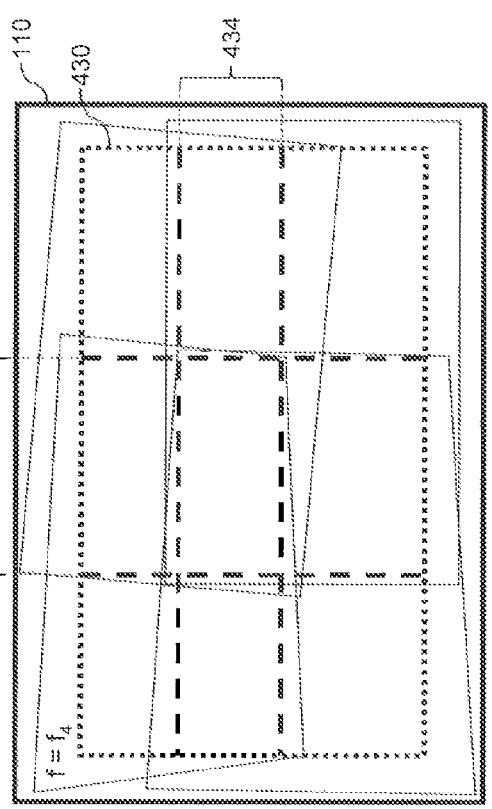
Figure 4A:
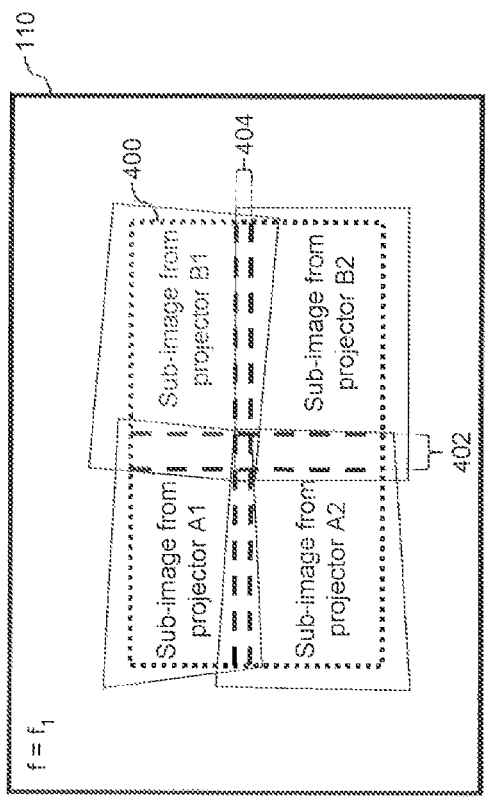
Figure 4C:
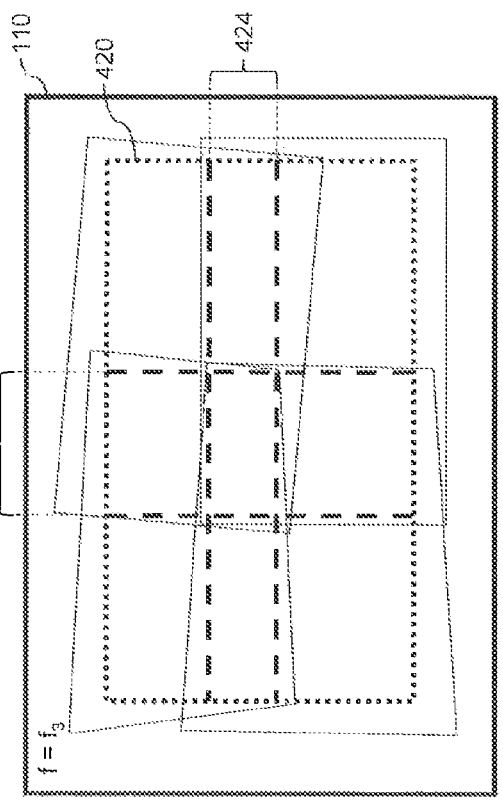

For the sake of illustration, as shown in FIG. 4A (corresponding to focal length $f_1$):

the whole upper part of vertical stripe 402 belongs both to the sub-image projected by projector A1 and the sub-image projected by projector B1 (it is to be noted that the sub-image projected by projector A1 extends from the left border of projection area 400 (upper part) to the right border of vertical strip 402 (upper part), meaning projector A1 does not project light outside this area as described by reference to FIG. 5A; likewise the sub-image projected by projector B1 extends from the right border of projection area 400 (upper part) to the left border of vertical strip 402 (upper part));

the whole lower part of vertical stripe 402 belongs both to the sub-image projected by projector A2 and the sub-image projected by projector B2 (again, it is noted that the sub-image projected by projector A2 extends from the left border of projection area 400 (lower part) to the right border of vertical strip 402 (lower part); likewise the sub-image projected by projector B2 extends from the right border of projection area 400 (lower part) to the left border of vertical strip 402 (lower part));

the whole left part of horizontal stripe 404 belongs both to the sub-image projected by projector A1 and the sub-image projected by projector A2 (it is observed that the sub-image projected by projector A1 extends from the upper border of projection area 400 (left part) to the lower border of horizontal strip 404 (left part); likewise the sub-image projected by projector A2 extends from the lower border of projection area 400 (left part) to the upper border of horizontal strip 404 (left part)); and, the whole right part of horizontal stripe 404 belongs both to the sub-image projected by projector B1 and the sub-image projected by projector B2 (it is observed that the sub-image projected by projector B1 extends from the upper border of projection area 400 (right part) to the lower border of horizontal strip 404 (right part); likewise the sub-image projected by projector B2 extends from the lower border of projection area 400 (right part) to the upper border of horizontal strip 404 (right part)).

The projection areas and blending zones corresponding to focal lengths $f_2$, $f_3$, and $f_4$ are determined similarly to those corresponding to focal length $f_1$.

The coordinates of the points delimiting the stripes (i.e. blending zones), typically the corners of the stripes, can be expressed in the coordinate system of the original input image, in pixels, for each of the focal lengths ($f_1$, $f_2$, $f_3$ and $f_4$). After being determined, these coordinates are transmitted by the control apparatus 125 to the video projectors A1, B1, A2, and B2.

Additionally, the control apparatus 125 determines and distributes common up-scale and down-scale factors to be applied by all video projectors before and after an interpolation step, respectively. Such up-scale and down-scale factors are advantageously used for correcting the geometric distortion as described hereinafter. An example of such up-scaling, interpolating, and down-scaling steps is described with reference to FIGS. 7 to 10. It is to be noted that the scale factors vary according to the focal lengths (decreasing focal length means bigger screen images with larger overlapping and blending zones, hence it possibly requires a decrease of digital up-scaling).

Figure 5A:
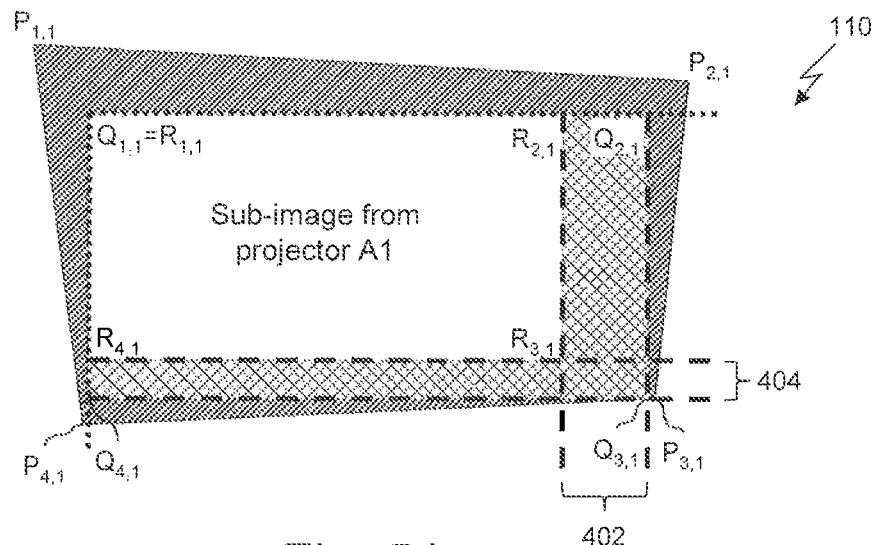
FIG. 5A and FIG. 5B, shows the projection area of a projector for a given target focal length, using both screen coordinates and projector's pixel coordinates.
Figure 5B:
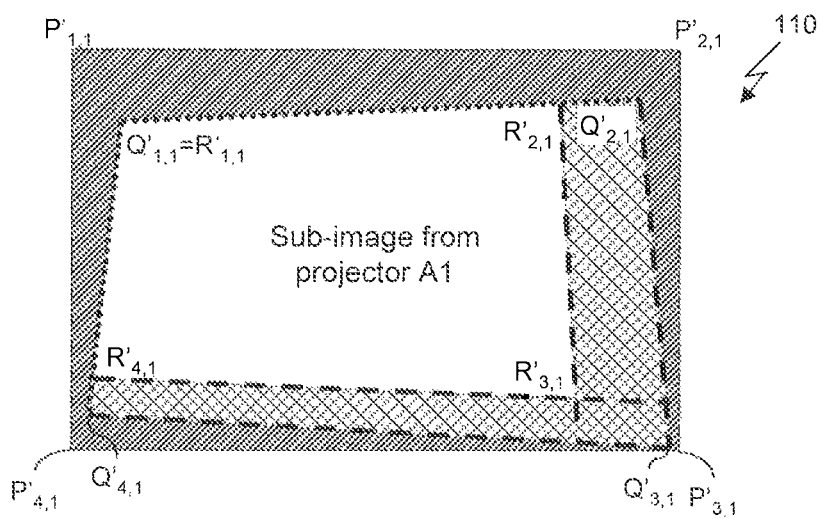

FIG. 5, comprising FIGS. 5A and 5B, illustrates the projection area associated with a video projector for a given focal length. FIG. 5A illustrates the projection area according to the screen coordinates while FIG. 5B illustrates the same projection area according to the projector's coordinates.

FIG. 5A is a partial view of FIG. 4A, representing the projection area associated with projector A1, corresponding to focal length $f_1$ (other focal lengths are handled similarly).

The projection area of video projector A1, in which a sub-image is to be projected, is the quadrilateral area having the corners marked $P_{1,1}$, $P_{2,1}$, $P_{3,1}$, and $P_{4,1}$. In this quadrilateral area, the rectangular sub-image area is defined by the corners marked $Q_{1,1}$, $Q_{2,1}$, $Q_{3,1}$, and $Q_{4,1}$. Within this sub-image area, the white rectangle having the corners marked $R_{1,1}$, $R_{2,1}$, $R_{3,1}$, and $R_{4,1}$ should be displayed with full brightness (i.e. projector A1 is the only one projecting in this area) while in the x-hatched remaining portion of the sub-image area (corresponding to parts of stripes 402 and 404 in FIG. 4A, as illustrated), blending with parts of sub-images projected by neighboring projectors needs to be applied. The dark diagonally-hatched area outside the sub-image rectangle should remain black (no part of the sub-image should be displayed in this area).

It is to be noted that since video projector A1 has the task of projecting the top-left corner of the image issued by video source 135, the top-left corner of the rectangular sub-image area (point $Q_{1,1}$) preferably coincides with the top-left corner of the rectangle wherein the sub-image is to be displayed with full brightness (point $R_{1,1}$). Likewise, point $R_{2,1}$ preferably belongs to straight line ($Q_{1,1}$, $Q_{2,1}$) and point $R_{4,1}$ preferably belongs to straight line ($Q_{1,1}$, $Q_{4,1}$). For the other video projectors, depending on the relative position of their projection area, other similar coincidences (or none at all) may exist.

As described above, FIG. 5B corresponds to FIG. 5A using a different coordinate system. While FIG. 5A illustrates a projection area according to the projection screen coordinates, FIG. 5B illustrates the same projection area according to the projector's coordinates. In other words, FIG. 5B is equivalent to FIG. 5A, showing the same information (at the same focal length) but from the point of view of the video projector A1.

Corresponding points of FIGS. 5A and 5B share same references, the ones from FIG. 5B being marked with a prime symbol ('). Accordingly, points $P'_{1,1}$, $P'_{2,1}$, $P'_{3,1}$, and $P'_{4,1}$ correspond to the four corners of the area that can be illuminated by video projector A1 (i.e. the area defined by the corners $P_{1,1}$, $P_{2,1}$, $P_{3,1}$, and $P_{4,1}$ in FIG. 5A), which is rectangular according to the projector's co-ordinates. The quadrilateral areas delimited by corners $Q'_{1,1}$, $Q_{2,1}$, $Q_{3,1}$, and $Q_{4,1}$ and corners $R'_{1,1}$, $R'_{2,1}$, $R'_{3,1}$, and $R'_{4,1}$ represent the projection area (with and without the bending zones, respectively) of the sub-image that is to be projected by projector A1. They are defined by applying a geometric distortion corresponding to the inverse of the geometric distortion engendered through the projection (as illustrated by the quadrilateral area having corners $P_{1,1}$, $P_{2,1}$, $P_{3,1}$, and $P_{4,1}$ in FIG. 5A).

As described above, the projection screen is flat here and the geometric distortion to be applied is a homography which can be easily defined as a 3×3 matrix H having real coefficients and which can be determined from four pairs of corresponding points, for example points $P_{1,1}$, $P_{2,1}$, $P_{3,1}$, and $P_{4,1}$ and their respective counterparts $P'_{1,1}$, $P'_{2,1}$, $P'_{3,1}$, and $P'_{4,1}$.

In a preferred embodiment, each video projector applies its specific geometric distortion correction to its rectangular input sub-image chunk prior to projecting, which results in image processing being distributed within the multi-projection system.

Figure 6:
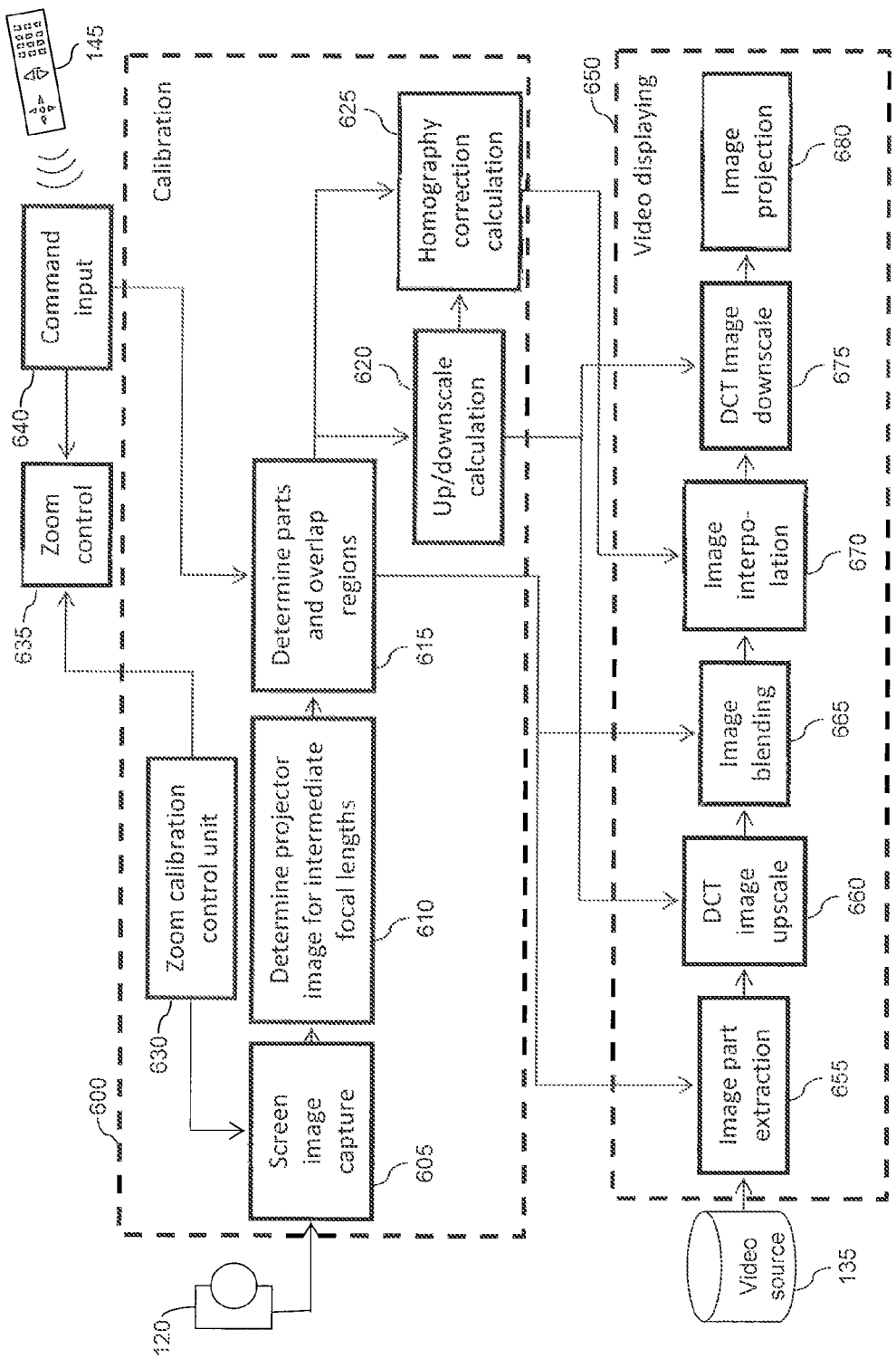
FIG. 6 is a partial functional diagram of a video system according to the invention.

FIG. 6 illustrates schematically and partially the functional architecture of a control apparatus and a video projector, for example the control apparatus 125 and one of the video projectors 105-1 to 105-4 of FIG. 1. For the sake of clarity, the functional blocks that relate to control apparatus 125 are regrouped in the "calibration" section marked 600 and the functional blocks that relate to the video projector are regrouped in the "video displaying" section marked 650.

One or more pictures supplied by the calibration camera 120 are captured and analyzed in block 605 to allow identification of points of interest of the projected calibration sub-images for the selected calibration focal length ($f_{cal\_1}$ or $f_{cal\_2}$). Typically, these points of interest are the corners of the quadrilateral areas 200-1 to 200-4 or 205-1 to 205-4 illuminated by each projector, corresponding to calibration focal lengths $f_{cal\_1}$ or $f_{cal\_2}$, as described by reference to FIG. 2.

The coordinates of the determined points of interest are computed in block 610 according to the preceding description with reference to FIG. 3.

The projection areas where the sub-images have to be projected (for example the zones of the projection areas 400, 410, 420, and 430 described with reference to FIG. 4) are then determined in block 615. The blending zones between these projection areas (for example the blending zones 402 and 404, 412 and 414, 422 and 424, and 432 and 434 described with reference to FIG. 4), and more particularly the borders of those blending zones, are also determined in block 615. As described above, the borders of the blending zones delimit the sub-image parts that are illuminated by one video projector relative to the sub-image parts that are illuminated by two or more video projectors. As described with reference to FIG. 4, the blending zones depend upon the selected focal length.

The up-scale and down-scale factors to be used by all the video projectors, before and after the interpolation step, respectively, are determined in block 620. In a preferred embodiment, the down-scale factor is fixed at 2.0 while the upscale factor is chosen in such a way that the ratio between the number of pixels in the up-scaled chunk per projector of the input sub-image versus the number of pixels in the keystone-corrected image prior to down-scaling is close to 1:1 for all the projectors. As stated before, the upscale factor varies with the focal length. The pixel grid corresponding to the up-scaled input image covers the whole projection area of each projector (for example projection areas 400, 410, 420, and 430 of FIG. 4) and hence is common to all the projectors for a given common focal length, i.e. each projector operates on a rectangular sub-grid extracted from the common grid.

The geometric distortion correction, that is to say the homography, is determined in block 625, for each video projector, using the correspondences between the determined points of interest, as described by reference to FIG. 5. This block advantageously takes into account both the up-scaling and the down-scaling factors to establish a nearest-neighbor interpolation relationship between the pixel grid corresponding to the up-scaled input image and the oversampled pixel grid geometrically aligned with the projector's pixel grid. An example of up-scaling, interpolation, and down-scaling steps is described below with reference to FIGS. 7 to 10.

According to FIG. 6, block 630 has the task of selecting the calibration focal lengths (here $f_{cal\_1}$ and $f_{cal\_2}$) during system installation or start-up. As illustrated, it communicates these focal lengths both to block 605 and to block 635.

Block 635 has the task of positioning the projector's optical zoom to a given focal length (zoom lenses are preferably driven by a stepper motor ensuring precise and reproducible settings). Positioning commands can be received either from block 630 during system installation or start-up or from block 640 during the projection stage.

Block 640 receives user-issued zoom commands during the projection phase, e.g. through remote control 145, and accordingly issues both focal length change commands to block 635 and corresponding recalculation commands to block 615, which triggers updates of the parameters given to blocks 620, 625 (and consequently 660 and 670), 655 and 665 described hereinafter.

Rectangular parts of the images received from the video source 135 are extracted, forming sub-images to be projected, on a frame by frame basis, in block 655. Such extracted sub-images are projected, after having been modified to deal with distortions, by the video projector in which block 655 is implemented. Each sub-image corresponds to a sub-frame of a video sequence provided by the video source 135.

An up-scaling step is performed on each sub-frame in block 660, according to the up-scaling factor determined in block 620. An example of an up-scaling algorithm is described by reference to FIG. 10.

Block 665 performs blending in the sub-image region overlapping with a sub-image region projected by a neighboring video projector. This consists in smoothly reducing the brightness towards the sub-image border zone from maximum value to zero, in such a manner that the superposition of the sub-image projected by the neighbor (applying the blending in a complementary manner) results in constant brightness on the projection screen. The advantage of blending after, rather than before, up-scaling is smoother transition.

Block 670 performs a nearest-neighbor interpolation from the up-scaled input sub-image to the oversampled pixel grid geometrically aligned with the projector's pixel grid. For this purpose, a coordinate look-up table pre-calculated using the homography obtained from block 625 is used. The zones in the projected image that have to remain black (since they fall outside the image to be displayed) are advantageously determined during this interpolation step.

A down-scaling step is performed on each sub-frame in block 675, for example according to the algorithm described by reference to FIG. 10, according to the down-scale factor determined in block 620.

The resulting sub-image is projected on the projection screen (for example projection screen 110 in FIG. 1) by block 680.

The functions of blocks 605, 610, 615, 620, 630, and 640 are advantageously centralized while the functions of blocks 625 and 635 are advantageously distributed in each video projector (the transmission of data between the centralized and distributed blocks being carried over control network 130.

Furthermore, the functions of blocks 655 to 680 are preferably executed in a distributed and independent way for each of the video projectors that are part of the multi-projection system. However, depending on the nature of the data network 140 (point-to-multipoint or point-to-point) and the capabilities of the video source 135, the image extraction (block 655) can be performed by the latter (in a centralized way).

The aforementioned inverse geometric distortion is to be applied by each video projector to the whole rectangular image chunk it is in charge of projecting. Interpolation is used to that end for determining the color to be associated with computed coordinates of pixels (according to the inverse geometric distortion).

One of the simplest and lowest-cost interpolation methods is called nearest-neighbor interpolation. According to the nearest-neighbor interpolation, the coordinates of each projector's pixel are expressed in the pixel coordinate system of the projected image (which is similar to that of the original image) and a test is performed to determine whether or not the pixel belongs to the rectangular area in which the image chunk is to be projected and/or to a blending zone. If it does not belong to the rectangular area in which the image chunk is to be projected, the corresponding pixel should not be projected and if it belongs to a blending zone, a blending coefficient comprised between 0 and 1, by which the pixel's brightness has to be attenuated, is determined (as a function of the distance to the blending zone's borders).

Next, the nearest neighboring pixel of the input image (original image) is determined. If the input image pixels are situated on a regular rectangular grid with consecutive integer coordinates, the nearest neighbor can be obtained through rounding the projector pixel's coordinates to nearest integers. Finally, the projector's pixel is given the color of its nearest neighbor.

Figure 7:
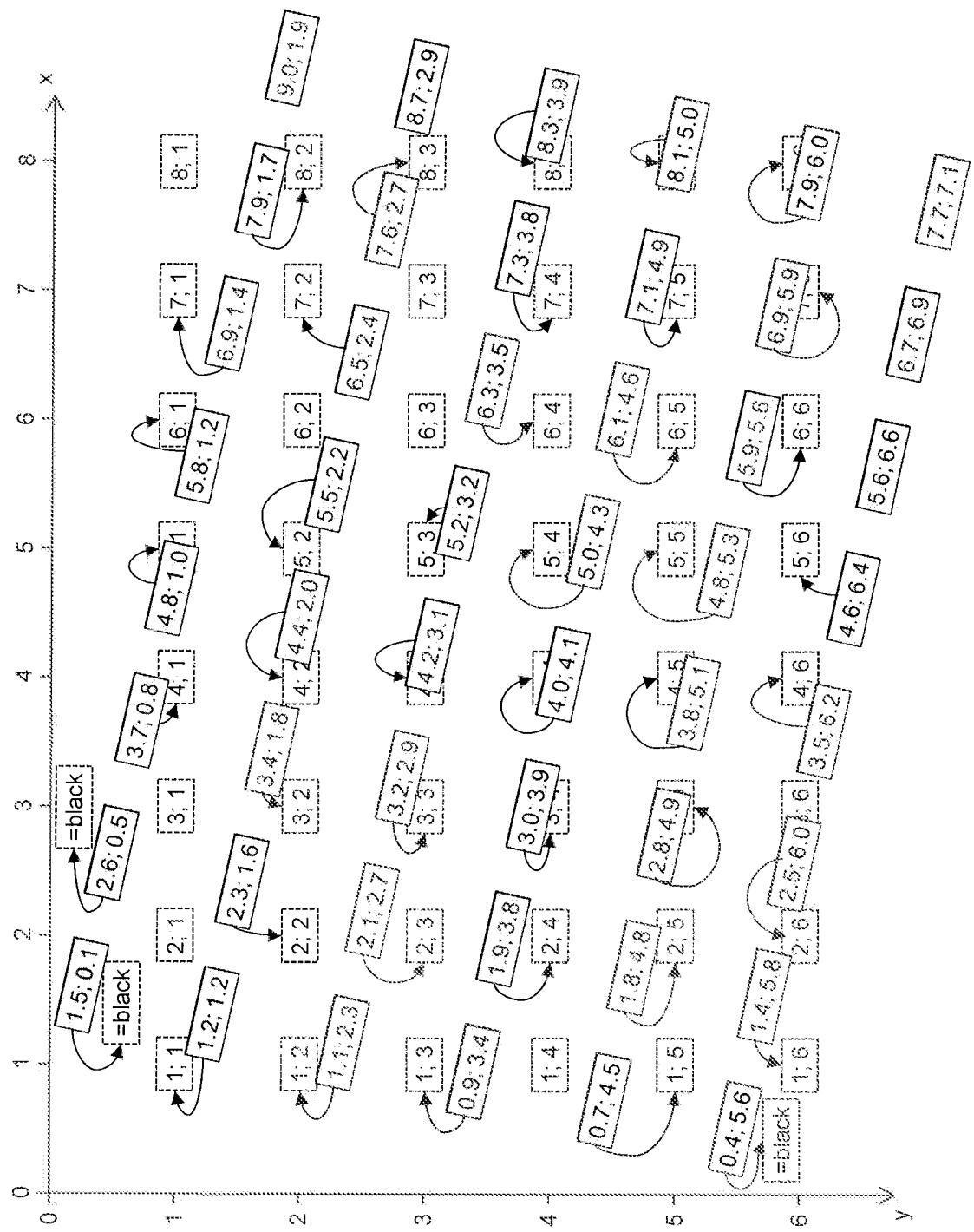
FIG. 7 illustrates geometric distortion correction through nearest-neighbor interpolation.

In the example illustrated in FIG. 7 (wherein dotted line squares represent input image pixels and solid line squares represent projector pixels), the input image pixels have consecutive integer coordinates beginning from (1, 1) while the computed projector's pixel coordinates, obtained through inverse geometric distortion, are non-integer (here rounded to one decimal).

According to this example, the projector pixels (1.5, 0.1), (2.6, 0.5) and (0.4, 5.6) fall outside the input image area and hence are "painted" black which means they should not be displayed. For each of the remaining projector pixels, an arrow points to the nearest neighboring input image pixel. For instance, the projector pixel (1.2, 1.2) takes the same color as the input image pixel (1, 1). As illustrated, the color of some input image pixels, for example pixels (2, 1), (3, 1), (6, 2), (6, 3), (7, 3), (1, 4), and (3, 6), is not taken into account at all because no projector pixels have them as nearest neighbors. This fact is undesirable because it may result in fine image features disappearing.

Figure 8:
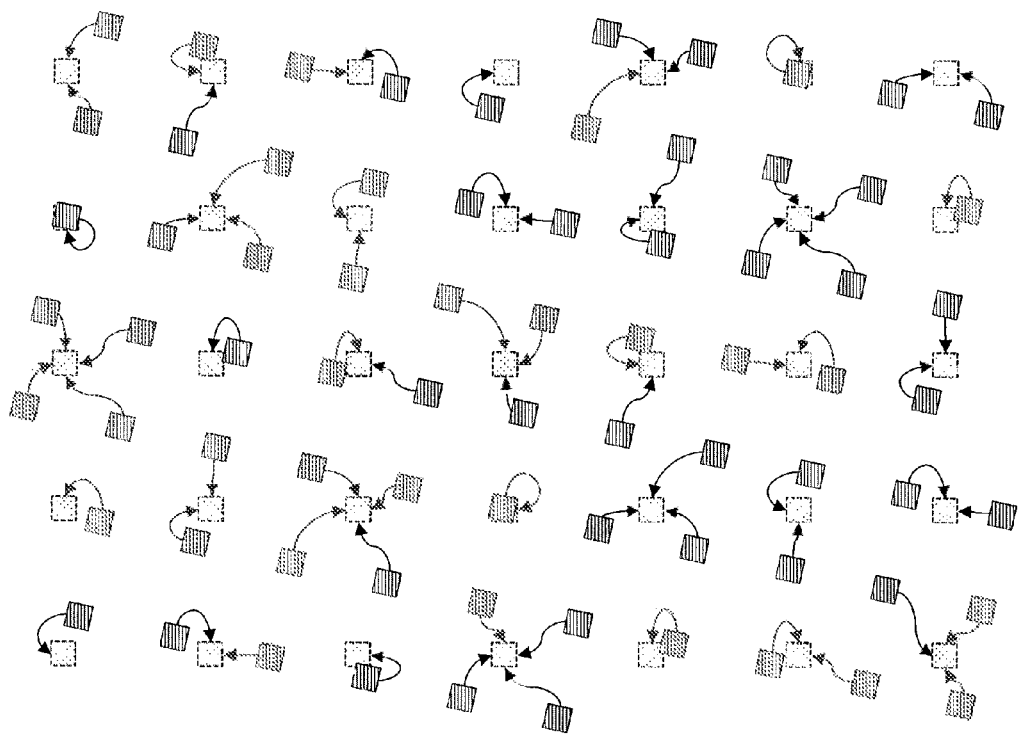
FIG. 8 illustrates the appearance of block artifacts when nearest-neighbor interpolation is used for a target resolution considerably higher than the source resolution.

FIG. 8 illustrates the appearance of block artifacts when nearest-neighbor interpolation is used for a target resolution considerably higher than the source resolution. This is likely to be the case in a multi-projector system when the aggregate projector resolution is higher than the input image resolution. Very often, for a given input image pixel, there are several adjacent projector pixels having this input image pixel as nearest neighbor. Consequently, these several adjacent projector pixels share the same color as the nearest neighbor as shown in FIG. 8 in which dotted squares represent input image pixels and hatched squares represent projector's pixels. As can be seen, the color of an input image pixel can be shared by two, three, or four adjacent projector pixels. As a result, unequal distribution of input colors and visually annoying blocking artifacts occur.

Accordingly, to avoid such unwanted effects, it is desirable to upscale an image before performing a nearest neighbor interpolation and then to downscale the interpolated image, as schematically represented in FIG. 9 that comprises FIGS. 9A to 9D.

FIG. 9A shows the initial situation which is similar to the one shown in FIG. 8 wherein the projector's pixels are denser than the input image pixels. To deal with this situation, the input image is up-scaled, here with an upscale factor of 3.0, as shown in FIG. 9B where supplementary pixels are obtained, forming a much denser grid than the original pixels of the input image alone. It is to be noted that the upscale factor is not restricted to integer values. Consequently, the input image pixels of FIG. 9A don't need to have equivalent pixels (i.e. pixels situated at exactly the same position as the projector's pixels) within the up-scaled grid shown in FIG. 9B.

Furthermore, depending on the up-scale method used, even if a pixel in the up-scaled grid shown in FIG. 9B has a position identical to a pixel of the original input image, these two pixels don't need to have exactly the same colors (it is generally not the case when using the up-scale method described with reference to FIG. 10).

FIG. 9C illustrates the application of a nearest-neighbor interpolation step to the up-scaled image of FIG. 9B for obtaining the colors of a pixel grid that has the same geometrical orientation as the grid of the projector pixels, but being denser than the latter by a factor of 2.0. The interpolation hence results in an accordingly over-sampled version of the sub-image to be displayed by the projector in question.

FIG. 9D shows the final stage after down-scaling from the oversampled grid obtained during interpolation to the final projector pixel grid that is ready to be displayed. Depending on the down-scale method, even if a pixel in the down-scaled grid shown in FIG. 9D has a position identical to a pixel of the over-sampled grid shown in FIG. 9C, these two pixels don't need to have exactly the same colors (this is generally not the case when using the down-scale method of the embodiment described by reference to FIG. 10).

Figure 10:
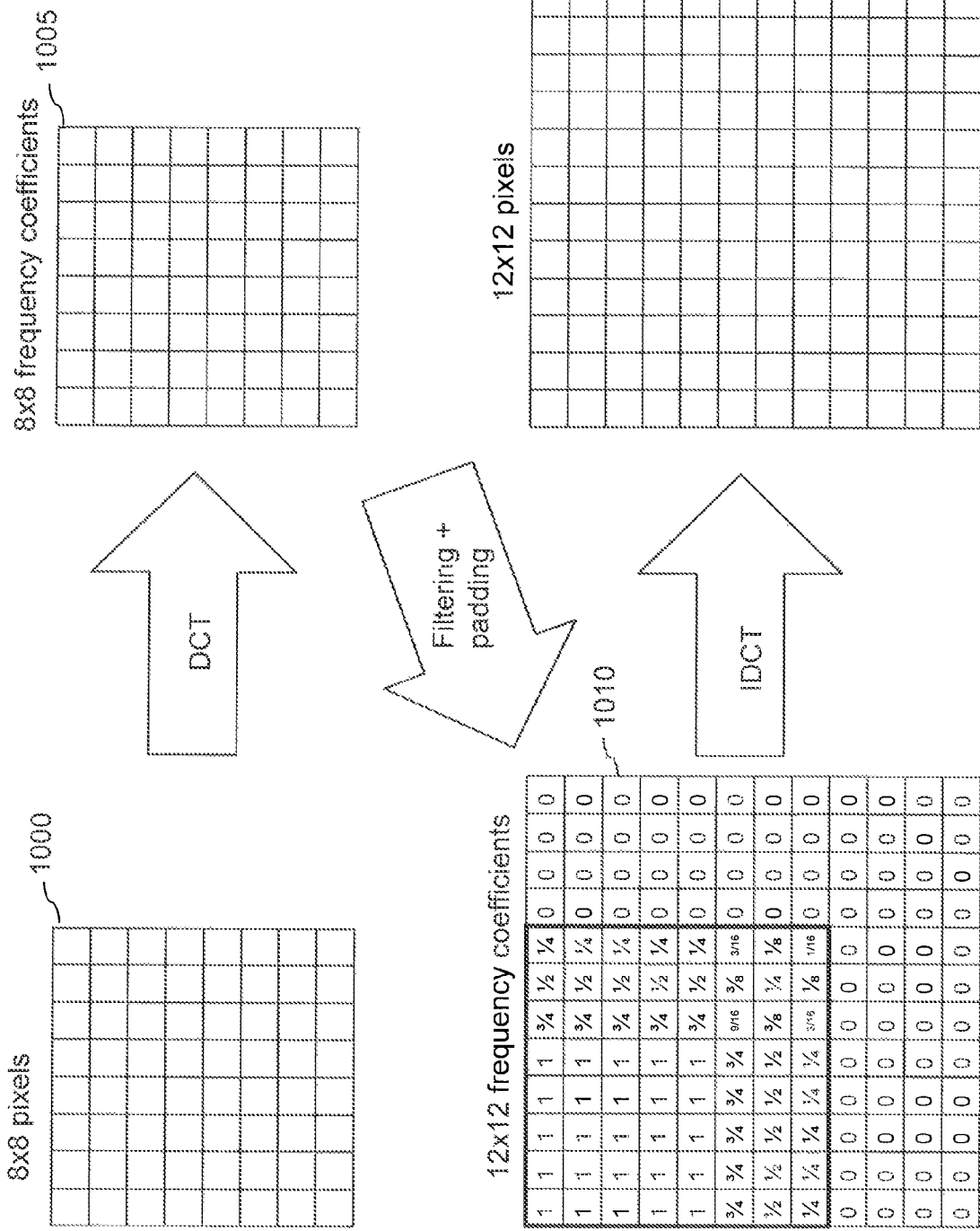
FIG. 10 illustrates an example of image up-scaling in the frequency domain.

FIG. 10 illustrates an example of up-scaling and down-scaling methods. According to this example, the up-scale factor is 12/8=1.5. Re-scaling is performed in the frequency domain. It is based on pixel blocks of square shape, for example an 8×8 pixel block (naturally, other block sizes and/or shapes can be used).

For the sake of illustration, block 1000 is an 8×8 pixel block extracted from the image to be up-scaled. Pixels of color images are typically composed of three components (R, G, and B) representing the pixel intensities of red, green, and blue components. An alternative representation frequently used is YCbCr with a luminance component Y and two chrominance components Cb and Cr. In either representation, each of the three components is usually represented as an integer value with a predetermined number of bits (most commonly 8 or 12, allowing for values ranging from 0 to respectively 255 or 4095). Each of the three color components is here treated independently.

Block 1005 (of the same size than block 1000), comprising 8×8 frequency components, is obtained from block 1000 by means of DCT (Discrete Cosine Transform). The frequency components are represented with horizontal spatial frequencies increasing from left to right and vertical spatial frequencies increasing from top to bottom, i.e. the top-left corner of the block contains the continuous component. The frequency components can be represented as floating-point numbers or rounded to signed integers (more bits are needed to represent the frequency components than the initial color component values). It is to be noted that efficient DCT algorithms exist treating n×n blocks with a time complexity of $O(n^2 \times \log n)$.

Next, block 1010, for example a block of 12×12 components, is obtained from block 1005 by padding the right and the bottom of the former with an appropriate number of null coefficients (e.g. 4 rows and 4 columns). It is to be noted that the padding coefficients take the place of supplementary highest frequency coefficients. Furthermore, to prevent ringing artifacts due to Gibbs phenomenon, the original high-frequency components are successively attenuated by multiplying them with a predetermined coefficient as shown in block 1010.

It is to be noted that up-scale factors different from the one illustrated in FIG. 10 can be obtained by using a different number of zero-coefficients for padding rows and columns (the granularity of the factor being 1/8 or more generally 1/n when the size of the extracted image block is n×n).

Similarly, down-scaling can be obtained through discarding highest-frequency components of block 1005 instead of zero-padding, the filtering coefficients being adjusted accordingly.

Next, the final step is an IDCT (Inverse Discrete Cosine Transform) to obtain pixel block 1015 of the desired size (e.g. 12×12) from the frequency block 1010. This step can be completed by scaling the pixel values and possibly clipping them to the desired target range (e.g. from 0 to 255 or 4095).

It is to be noted that DCT or similar transformations are an essential part of lossy video compression standards as MPEG or H.264. If the video system receives a video stream compressed according to such a standard and unless this streams uses further compression techniques such as spatial prediction (between adjacent macro-blocks) or temporal prediction (between adjacent video frames), the incoming video data is already in the form of frequency coefficients after entropy decoding and de-quantization, allowing the processing chain to be optimized by integrating the video decoding and up-scaling steps.

Figure 11:
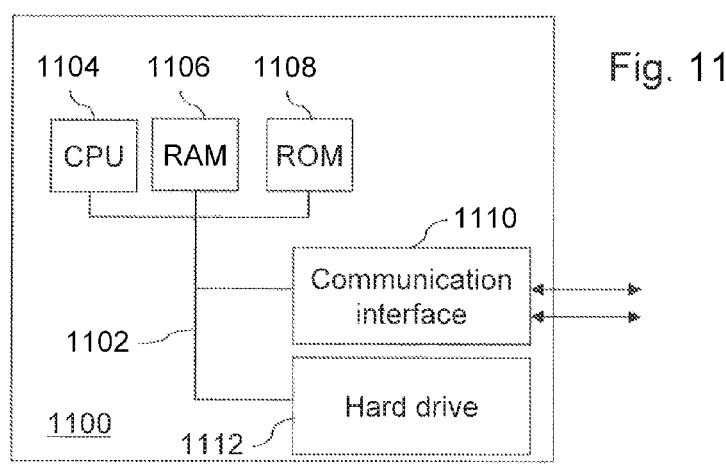
FIG. 11 shows a particular hardware configuration of an information processing device adapted for implementing method steps according to the invention.

With reference to FIG. 11, a description is now given by way of example of a particular hardware configuration of a processing device adapted for implementing method steps according to the invention.

The processing device 1100 comprises a communication bus 1102 to which there are connected:

- a central processing unit CPU 1104 taking for example the form of a microprocessor;
- a random access memory 1106, which, after powering up of the device 1100, contains the executable code of the programs of the invention as well as registers adapted to record variables and parameters necessary for the implementation of the invention;
- a read only memory 1108 in which may be contained the programs whose execution enables the implementation of the method according to the invention;
- a communication interface 1110 connected to the control and video networks described above; and
- an optional hard disk 1112 or a storage memory, such as a memory of compact flash type, able to contain the programs of the invention as well as data used or produced on implementation of the invention.

The communication bus 1102 permits communication and interoperability between the different elements included in the device 1100 or connected to it. The representation of the bus 1102 is non-limiting and, in particular, the central processing unit 1104 may communicate instructions to any element of the device 1100 directly or by means of another element of the device 1100.

The executable code enabling the processing device to implement, at least partially, the invention may equally well be stored in read only memory 1108, on the hard disk 1112 or on a removable digital medium (not represented). According to a variant, the executable code of the programs is received by the intermediary of a telecommunications network, via the interface 1110, to be stored in one of the storage means of the device 1100 (such as the hard disk 1112) before being executed.

The central processing unit 1104 controls and directs the execution of the instructions or portions of software code of the program or programs of the invention, the instructions or portions of software code being stored in one of the aforementioned storage means. On powering up of the device 1100, the program or programs which are stored in a non-volatile memory, for example the hard disk 1112 or the read only memory 1108, are transferred into the random-access memory 1106, which then contains the executable code of the program or programs of the invention, as well as registers for storing the variables and parameters necessary for implementation of the invention.

It will also be noted that the device implementing the invention or incorporating it may be implemented in the form of a programmed device. For example, such a device may then contain the code of the computer program(s) in a fixed form in an application specific integrated circuit (ASIC).

Naturally, in order to satisfy local and specific requirements, a person skilled in the art may apply to the solution described above many modifications and alterations all of which, however, are included within the scope of protection of the invention as defined by the following claims.

The invention claimed is:

1. A method for controlling at least one video projector in a video projection system comprising multiple video projectors amongst which is the at least one video projector, each of the video projectors of the video projection system having a modifiable focal length and being adapted to project sub-images of the images to be projected by the video projection system, the method comprising:
   - determining at least one first calibration parameter associated with a first predetermined focal length of the video projectors;
   - computing at least one second calibration parameter corresponding to a second predetermined focal length of the video projectors, the at least one second calibration parameter being computed as a function of the at least one first calibration parameter, the second predetermined focal length being different from the first predetermined focal length;
   - computing at least one display parameter for at least the at least one video projector, the at least one display parameter being computed as a function of the at least one second calibration parameter; and
   - calculating at least one sub-image to be projected by the at least one video projector, according to the at least one computed display parameter.

2. The method of claim 1, wherein the at least one first and second calibration parameters comprise positions of predetermined points of sub-images projected by video projectors of a set of the video projectors, the set of video projectors comprising the at least one video projector and wherein the at least one display parameter relates to a projection position of a sub-image to be projected by the at least one video projector.

3. The method of claim 2, wherein the step of determining at least one first calibration parameter comprises a step of analysing a picture representing sub-images projected by the video projectors of the set of video projectors.

4. The method of claim 1, wherein the step of computing at least one display parameter uses a keystone distortion correction algorithm.

5. The method of claim 1, wherein the step of computing at least one display parameter comprises the two determining steps of determining at least one sub-image that is to be projected by the at least one video projector and determining the projection position of the at least one sub-image that is to be projected by the at least one video projector, wherein the two determining steps are based upon the at least one second calibration parameter.

6. The method of claim 5, wherein the at least one display parameter comprises parameters of partitioning, re-scaling, and geometric distortion correction of images to be displayed by the video projection system for each of the video projectors of the video projection system.

7. The method of claim 1, wherein the step of computing at least one display parameter further comprises a step of determining at least one blending area in a projection area associated with the at least one video projector, common to projection areas associated with other video projectors of the video projection system, so that the luminance of pixels projected in the at least one blending area is constant.

8. The method of claim 1, wherein the first predetermined focal length of the video projectors is the minimum focal length of the projectors' zoom lenses.

9. The method of claim 1, wherein the at least one first calibration parameter is determined for at least two distinct calibration focal lengths.

10. The method of claim 9, wherein the at least two distinct calibration focal lengths comprise the minimum and maximum focal lengths of the projectors' zoom lenses.

11. The method of claim 1, wherein the step of calculating at least one sub-image to be projected by the at least one video projector comprises a step of up-scaling a part of an image to be projected by the video projection system, interpolating points of the part of the image, and down-scaling the part of the image.

12. A non-transitory computer readable medium having stored thereon a program that causes an apparatus to execute the method according to claim 1.

13. An apparatus for controlling at least one video projector in a video projection system comprising multiple video projectors amongst which is the at least one video projector, each of the video projectors of the video projection system having a modifiable focal length and being adapted to project sub-images of the images to be projected by the video projection system, the apparatus comprising at least one microprocessor configured for carrying out the steps of,
  determining at least one first calibration parameter associated with a first predetermined focal length of the video projectors;
  computing at least one second calibration parameter corresponding to a second predetermined focal length of the video projectors, the at least one second calibration parameter being computed as a function of the at least one first calibration parameter and the second predetermined focal length being different from the first predetermined focal length;
  computing at least one display parameter for the at least one video projector, the at least one display parameter being computed as a function of the at least one second calibration parameter; and
  calculating at least one sub-image to be projected by the at least one video projector according to the at least one computed display parameter.

14. The apparatus of claim 13, wherein at least one of the at least one microprocessor is common to a plurality of video projectors of the video projection system.

15. The apparatus of claim 13, wherein at least one of the at least one microprocessor is dedicated to one of the video projectors of the video projection system.

16. The apparatus of claim 13 wherein the at least one microprocessor is further configured for carrying out a step of analysing a picture representing sub-images projected by the video projectors of the set of video projectors when carrying out the step of determining at least one first calibration parameter.

17. The apparatus of claim 13 wherein the at least one microprocessor is further configured for implementing a keystone distortion correction algorithm when carrying out the step of computing at least one display parameter.

18. The apparatus of claim 13 wherein the at least one microprocessor is further configured for carrying out determining steps of determining at least one sub-image that is to be projected by the at least one video projector and determining the projection position of the at least one sub-image that is to be projected by the at least one video projector, when computing at least one display parameter, wherein the two determining steps are based upon the at least one second calibration parameter.

19. The apparatus of claim 13 wherein the at least one microprocessor is further configured for carrying out a step of determining at least one blending area in a projection area associated with the at least one video projector, common to projection areas associated with other video projectors of the video projection system, when carrying out the step of computing at least one display parameter, so that the luminance of pixels projected in the at least one blending area is constant.

20. The apparatus of claim 13 wherein the at least one microprocessor is further configured for carrying out a step of up-scaling a part of an image to be projected by the video projection system, interpolating points of the part of the image, and down-scaling the part of the image, when carrying out the step of calculating at least one sub-image to be projected by the at least one video projector.

* * * * *